(12) United States Patent
Adams et al.

(10) Patent No.: US 10,592,090 B2
(45) Date of Patent: Mar. 17, 2020

(54) ANIMATIONS FOR SCROLL AND ZOOM

(71) Applicant: Microsoft Technology Licensing, LLC, Redmond, WA (US)

(72) Inventors: Tyler Robert Adams, Kirkland, WA (US); Michael Ivan Borysenko, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 129 days.

(21) Appl. No.: 15/470,234

(22) Filed: Mar. 27, 2017

(65) Prior Publication Data
US 2017/0200300 A1 Jul. 13, 2017

Related U.S. Application Data

(62) Division of application No. 13/295,802, filed on Nov. 14, 2011, now Pat. No. 9,607,420.

(51) Int. Cl.
| | |
|---|---|
| *G06F 3/0485* | (2013.01) |
| *G06F 3/048* | (2013.01) |
| *G06T 3/20* | (2006.01) |
| *G06T 13/80* | (2011.01) |
| *G06T 3/40* | (2006.01) |

(52) U.S. Cl.
CPC ............ *G06F 3/0485* (2013.01); *G06F 3/048* (2013.01); *G06T 3/20* (2013.01); *G06T 13/80* (2013.01); *G06F 2203/04806* (2013.01); *G06F 2206/1008* (2013.01); *G06T 3/40* (2013.01); *G09G 2340/04* (2013.01)

(58) Field of Classification Search
CPC .......... G06F 3/048; G06F 2203/04808; G06F 2200/1637; G06F 3/0485; G06T 3/20; G06T 13/80
See application file for complete search history.

(56) References Cited

U.S. PATENT DOCUMENTS

| | | |
|---|---|---|
| 7,302,648 B1 | 11/2007 | Brunner et al. |
| 9,607,420 B2 | 3/2017 | Adams |
| 2003/0128192 A1* | 7/2003 | van Os .................. G06F 3/0482 345/173 |

(Continued)

OTHER PUBLICATIONS

U.S. Appl. No. 13/295,802, Office Action dated Oct. 24, 2014, 18 pages.

(Continued)

*Primary Examiner* — Michelle L Sams

(57) ABSTRACT

Smooth animation effects during zooming are provided by retaining content displayed at a previous zoom level. If the zoom operation is a zoom out operation, new content is stretched to a current zoom level, aligned with the retained content, and placed underneath it. If the zoom operation is a zoom in operation, new content is scaled down to the current zoom level, aligned with the retained content, and displayed on top of the retained content. The new content is then zoomed with the retained content. The retained content is then deleted. When zooming out, the retained content fades out. When zooming in, the new content fades in. Smooth scrolling animation is also provided by pre-rendering a portion of content and teleporting to a final viewport position and thereby skipping over blank content.

30 Claims, 16 Drawing Sheets

(56) References Cited

U.S. PATENT DOCUMENTS

| | | | |
|---|---|---|---|
| 2004/0189669 A1 | 9/2004 | David et al. | |
| 2004/0222992 A1 | 11/2004 | Calkins et al. | |
| 2006/0033745 A1 | 2/2006 | Koselj et al. | |
| 2006/0184894 A1 | 8/2006 | Daniels et al. | |
| 2007/0013708 A1* | 1/2007 | Barcklay | G06F 3/0485 345/557 |
| 2007/0252834 A1* | 11/2007 | Fay | G06T 3/4092 345/428 |
| 2008/0034292 A1 | 2/2008 | Brunner et al. | |
| 2009/0100373 A1 | 4/2009 | Pixley et al. | |
| 2010/0171759 A1 | 7/2010 | Nickolov et al. | |
| 2010/0214313 A1 | 8/2010 | Herman et al. | |
| 2010/0235769 A1 | 9/2010 | Young et al. | |
| 2010/0289825 A1 | 11/2010 | Shin | |
| 2011/0001753 A1 | 1/2011 | Frej et al. | |
| 2011/0179368 A1 | 7/2011 | King et al. | |
| 2012/0188246 A1 | 7/2012 | Cheung et al. | |
| 2012/0254780 A1* | 10/2012 | Mouton | G06F 3/04883 715/765 |
| 2012/0272182 A1* | 10/2012 | Jitkoff | G06F 3/0485 715/786 |
| 2014/0300647 A1 | 10/2014 | Villegas et al. | |

OTHER PUBLICATIONS

U.S. Appl. No. 13/295,802, Amendment and Response filed Feb. 24, 2015, 12 pages.

U.S. Appl. No. 13/295,802, Office Action dated Apr. 1, 2015, 18 pages.

U.S. Appl. No. 13/295,802, Amendment and Response filed Jul. 28, 2015, 13 pages.

U.S. Appl. No. 13/295,802, Office Action dated Aug. 19, 2015, 23 pages.

U.S. Appl. No. 13/295,802, Amendment and Response filed Dec. 18, 2015, 14 pages.

U.S. Appl. No. 13/295,802, Office Action dated Mar. 3, 2016, 23 pages.

U.S. Appl. No. 13/295,802, Amendment and Response filed May 19, 2016, 14 pages.

U.S. Appl. No. 13/295,802, Office Action dated Jun. 23, 2016, 8 pages.

U.S. Appl. No. 13/295,802, Amendment and Response filed Sep. 23, 2016, 10 pages.

U.S. Appl. No. 13/295,802, Notice of Allowance dated Nov. 15, 2016, 9 pages.

Word 2007 Tutorial—10 Working with pictures, Aug. 3, 2009, https://www.youtube.com/watch?v=Jn3G2GTINa4.

"dbe(3): Double Buffer Extension—Linux Man Page", Retrieved on Sep. 9, 2011, Available at: http://linux.die.net/man/3/dbe, pp. 2.

"The Frame Buffer", retrieved on Sep. 9, 2011, available at: http://www.yaldex.com/open-gl/ch01levlsec4.html, pp. 3.

"QuickDraw 3D RAVE API Support", retrieved on Sep. 9, 2011, available at: http://developer.amd.com/archive/gpusamples/3DRave/pages/default.aspx, pp. 8.

"Introduction to Filters and Transitions", Retrieved on Sep. 9, 2011, available at: http://msdn.microsoft.com/en-us/library/ms532847(v=vs.95).aspx, pp. 20.

"Animated Transition-Designing Interfaces", retrieved on Sep. 9, 2011, available at: http://designinginterfaces.com/firstedition/in-dex.php?page=Animated_Transition, pp. 2.

* cited by examiner

FIG. 5A

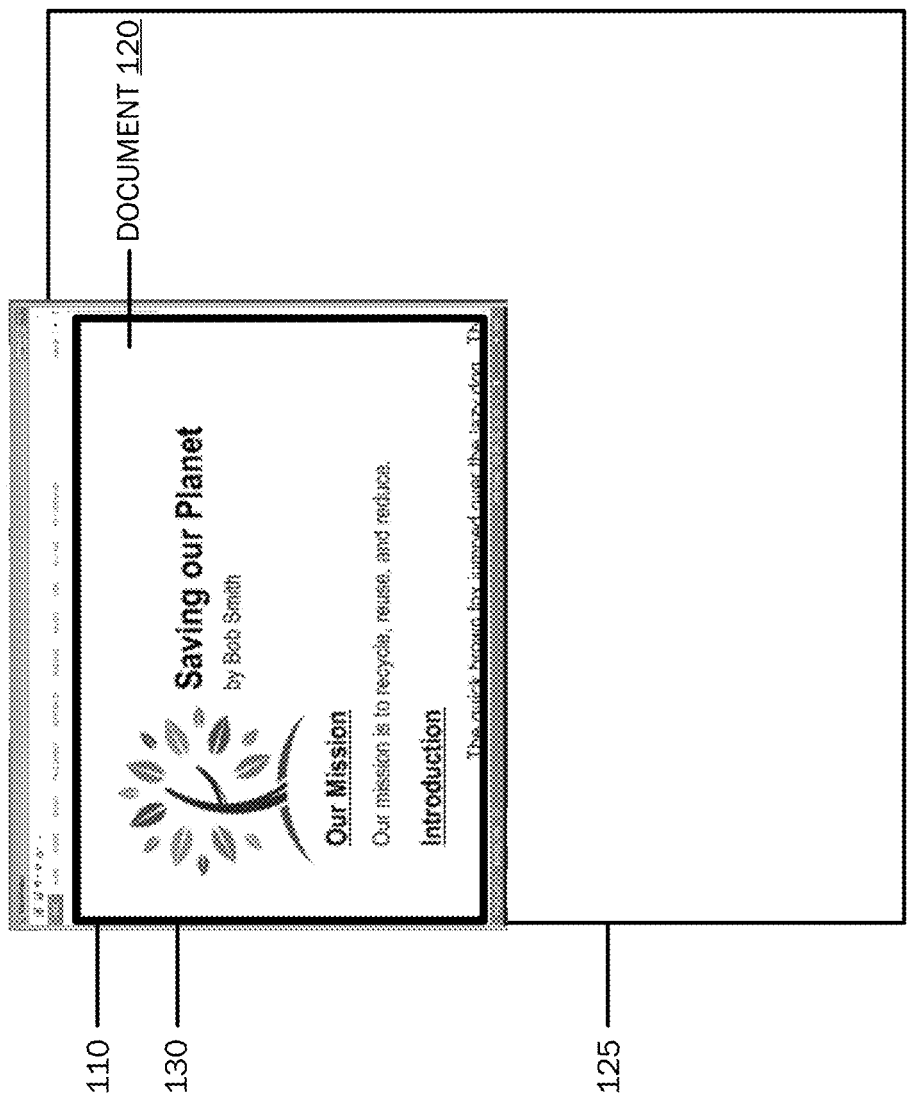

MOBILE COMPUTING DEVICE

ANIMATIONS FOR SCROLL AND ZOOM

CROSS-REFERENCE TO RELATED APPLICATIONS

This application is a divisional application of U.S. patent application Ser. No. 13/295,802, entitled "ANIMATIONS FOR SCROLL AND ZOOM," filed on Nov. 14, 2011, now U.S. Pat. No. 9,607,420, the entire disclosure of which is hereby incorporated herein by reference.

BACKGROUND

With the advent of computing, user interfaces have been developed for allowing users to interact with electronic content and underlying software application functionality. Such user interfaces may provide such functionalities as scrolling and zooming of content. For example, a user may use a scrolling functionality when using a word processing application to move up and down a document. Current scrolling operations may lack a smooth scrolling experience and may appear as a discontinuous vertical movement of content. Additionally, zooming operations may provide for rendering content (sometimes referred to herein as "textures") at an initial and a final zoom level. For example, a user can "zoom in" to get a close-up view of his/her document, or "zoom out" to see more of a page at a reduced size. Current zoom operations can appear jumpy to a user. For example, a document may be displayed at an initial zoom level. Upon selection of a higher zoom level (zoom in), the initial texture may be stretched during the zoom operation and then snapped to the second zoom level size after the operation. During the zoom out operation, the zoomed texture content may either not be rendered or may be missing, or users may have to wait for content to be rendered before performing the zooming operation. Content may be re-rendered at different zoom levels throughout a zoom operation, sometimes leading to a flashing effect.

It is with respect to these and other considerations that the present invention has been made.

SUMMARY

Embodiments of the present invention solve the above and other problems by storing and updating content to enable smooth animation effects during zooming and scrolling. According to embodiments, when utilizing a zooming functionality, content previously rendered at an initial zoom level may be retained and used to display content during a scrolling or zooming operation when content at a new zoom level has yet to be rendered. When content is updated to the new zoom level, the new content may be stretched to or scaled down to the new zoom level and displayed aligned with the old content. Animation effects, such as fade in and fade out may be utilized to provide a smooth zooming animation, and may prevent flashing when content is updated. Embodiments also provide for a smooth scrolling animation by pre-rendering a portion of content and teleporting to a final viewport position and thereby skipping over blank content.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings:

FIGS. 5A-5C are illustrations of the method of FIG. 4;

DETAILED DESCRIPTION

Figure 1:
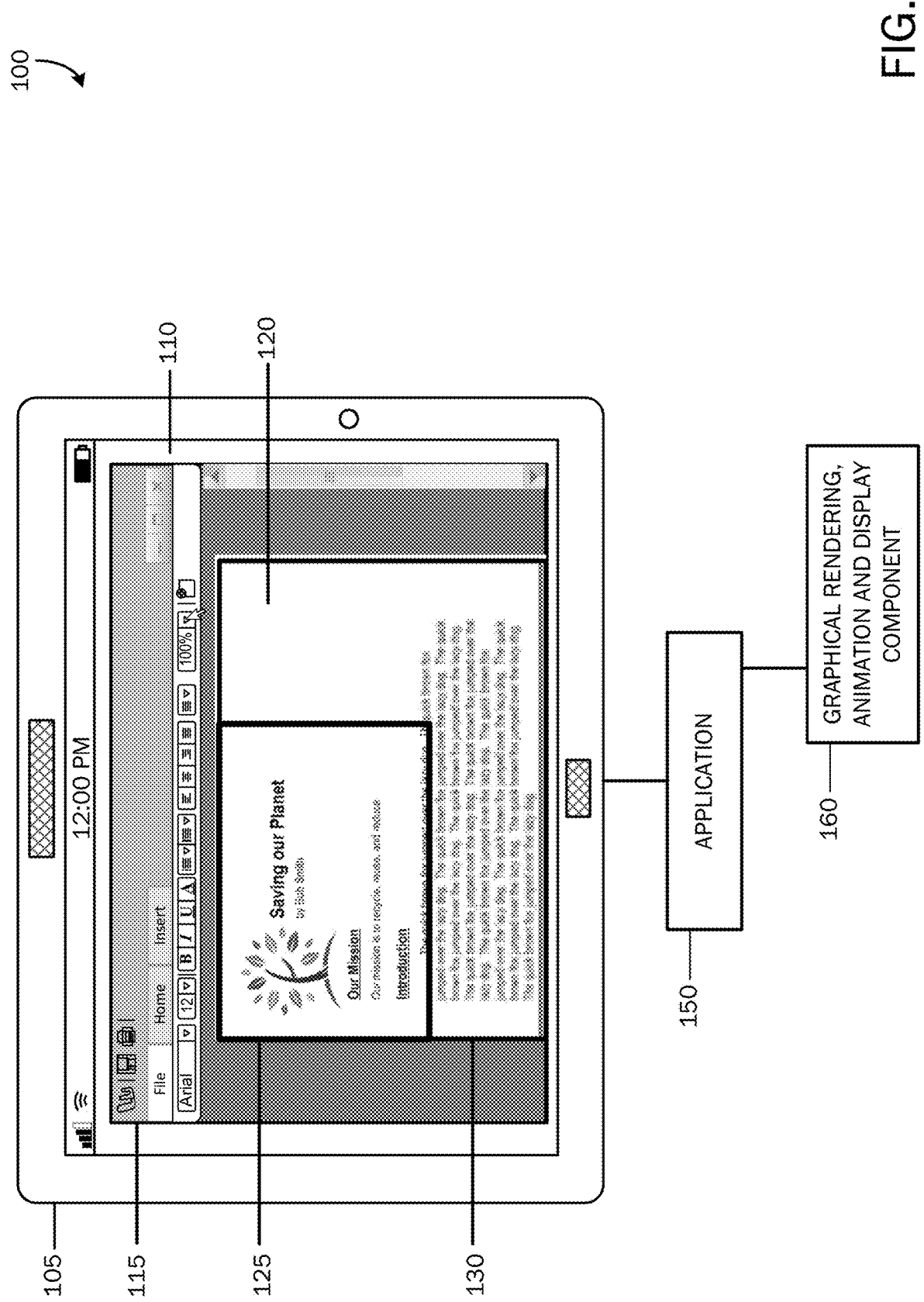
FIG. 1 is an illustration of a system architecture for providing smooth zooming and scrolling according to embodiments.

As briefly described above, embodiments of the present invention are directed to storing and updating content to enable smooth animation effects during zooming and scrolling.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates a system architecture for providing smooth zooming and scrolling operations. The system 100 includes a computing device, for example a tablet computer 105 having a computer display screen surface 110 for displaying one or more graphical display components associated with user content and/or software application user interface presentations. According to embodiments, the computer display screen 110 is illustrative of a computer display screen associated with a variety of suitable computing devices, described below with reference to FIGS. 10 through 12.

A displayed software application user interface and associated user content is displayed on the display surface 110. The user interface 115 is illustrative of a user interface and associated user content 120 enabled by a variety of software applications 150, for example, word processing applications, spreadsheet applications, slide presentation applications, electronic mail applications, notes applications, calendaring applications, and the like. That is, the user interface 115 is illustrative of any graphical display components that may be displayed onto a computer-enabled display surface 110 for review and use according to associated software application functionality. As illustrated in FIG. 1, the user interface 115 is illustrative of a word processing application user interface having a plurality of functionality controls and a user content display area. As should be understood, the illustrated user interface 115 is for purposes of example only and is not limiting of the vast number and types of graphical display components that may be displayed and managed according to embodiments of the invention described herein.

The graphical rendering, animation and display component 160 is illustrative of one or more software or hardware enabled processes for generating, rendering, storing, and displaying graphical display components to a computer display surface 110, as illustrated in FIG. 1. That is, the graphical rendering, animation and display component 160 may be illustrative of a software application containing sufficient computer-executable instructions for causing the generation, rendering, storage, and displaying of graphical display components to a computer display surface 110 for representing underlying functionality and data. For example, the component 160 may be a software application or software application component associated with a software application for generating, rendering, storing, and displaying software application user interfaces and for displaying user data in association with displayed user interfaces. According to one embodiment, the component 160 may be in the form of a user interface and content display and animation compositor application. Likewise, the component 160 may be illustrative of a software application module associated with or contained in a computer operating system (e.g., a desktop window or frame manager application) operative to generate, render, store and display graphical display components to a computer display surface 110.

In addition, the component 160 may be illustrative of a software application or software application module operative to provide for animation functions associated with graphical display components. For example, the component 160 may be operative to provide for smooth zooming and scrolling functionalities.

When content, such as text and objects in a document 120, is displayed in a user interface 115, the content may be rendered at an initial zoom level. As briefly described above, current scrolling and zooming operations may appear jumpy to a user. Additionally, while content is being rendered, a visual indication of the rendering of the content may not be provided. This may be interpreted by a user as an application being nonresponsive.

According to embodiments of the present invention, content may be displayed at an initial zoom level (the content displayed at the initial zoom level may herein be referred to as old content 125). A zoom functionality may be selected by a user via various methods. For example, zooming may be driven via selection of a zoom functionality control displayed in a user interface 115, via a keyboard selection, via a combination of a mouse and keyboard selection, via touch, as well as by other methods. According to embodiments, upon receiving an indication of a selection to zoom in or zoom out on content displayed at an initial zoom level, the old content 125 may be retained. While the content is being updated to a selected zoom level, the retained old content 125 may be zoomed such that a user may see something being zoomed and does not have to wait for content to be updated. The content being updated to be displayed at the selected zoom level (herein referred to as new content 130) may be stretched to or scaled down to the current zoom level and then animated to the selected zoom level. Depending on the direction of a zoom operation (e.g., zoom in or zoom out), either the new content or the retained old content may be of higher fidelity. In the case of zooming out, the new content may be of lower fidelity, and when stretched to the current zoom level, it may appear blurry. To reduce the amount of blurry content seen by a user, the higher fidelity (i.e., the retained content) may be placed on top of the lower fidelity content. Displaying higher fidelity content on top of lower fidelity content provides for the best resolution of content being displayed. By retaining and displaying old content 125, animation effects may be utilized to mask a delay of rendering the new content 130. A user may see an animation while the new content 130 is being rendered, which may be a visual indication of responsive behavior during scrolling and zooming operations.

Embodiments may provide various options for handling new content 130 when utilizing a zoom out functionality. If a client application 150 is unable to pre-render content in a zoom out operation, according to an embodiment, new content 130 may be provided after the zoom out operation. According to this embodiment, the old content 125 may be zoomed out from an initial zoom level to a lower selected zoom level. After zooming out, the new content 130 may be instantly displayed, and the old content 125 may be deleted. If additional content is provided during the zoom out operation, the additional content may be stretched to the current zoom level, aligned with the old content 125, and since it is of lower fidelity, it may be placed underneath the old content. The additional content may then be zoomed out with the old content 125.

Figure 2:
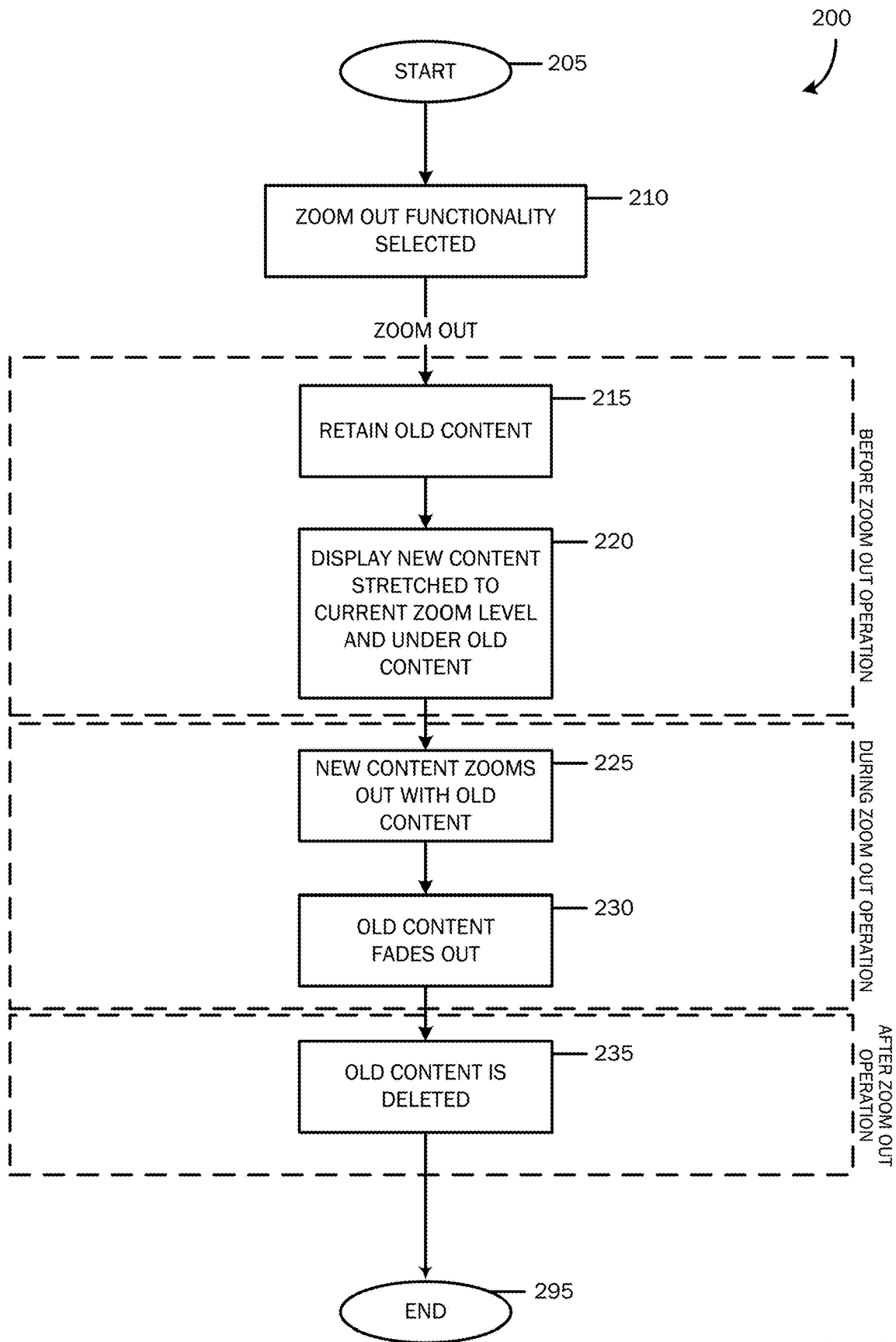
FIG. 2 is process flow diagram illustrating a method for providing content before a zoom out operation according to an embodiment.
Figure 3A:
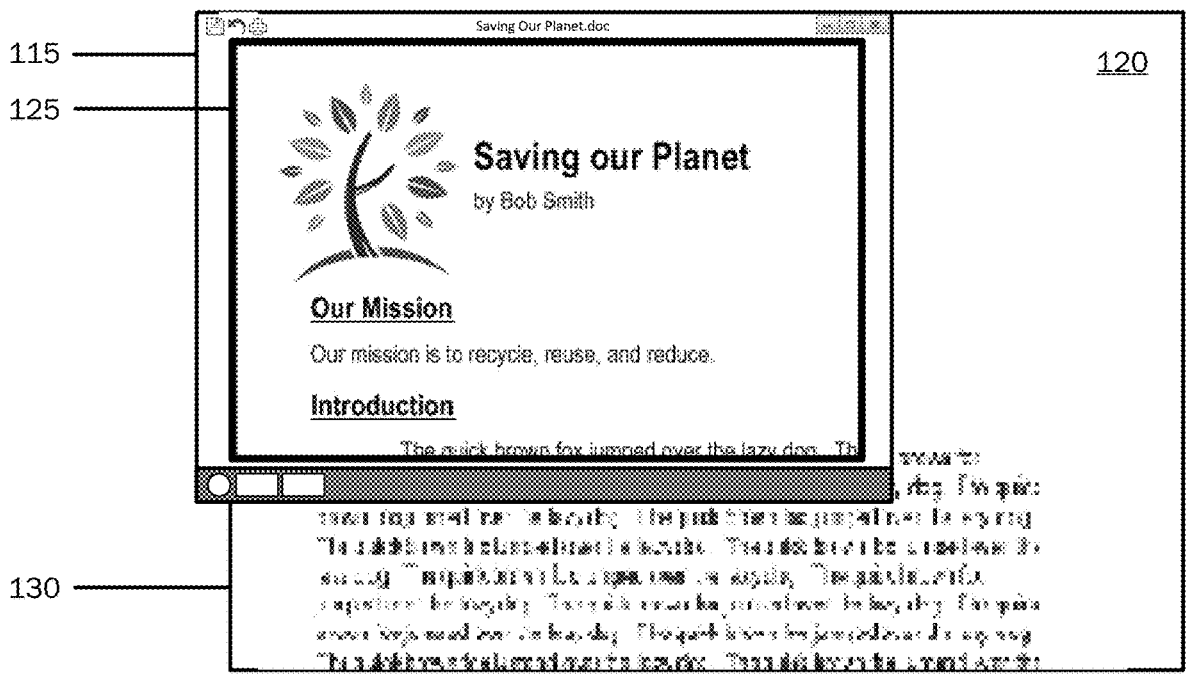
FIGS. 3A-3C are illustrations of the method of FIG. 2.
Figure 3B:
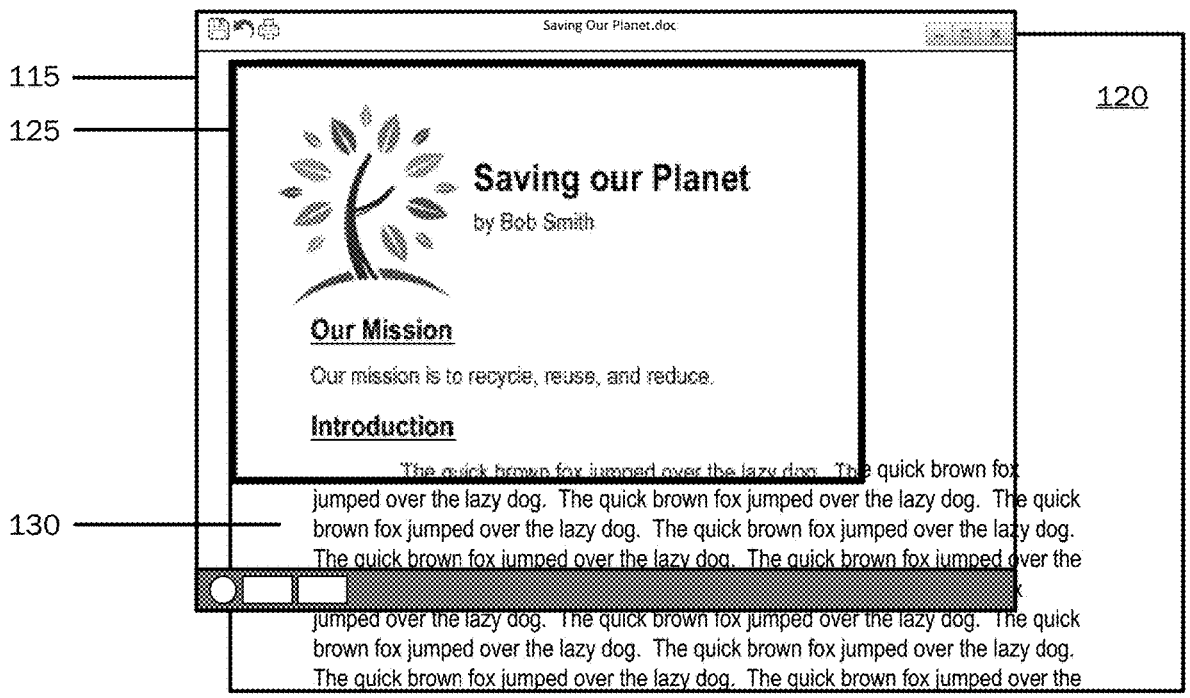
Figure 3C:
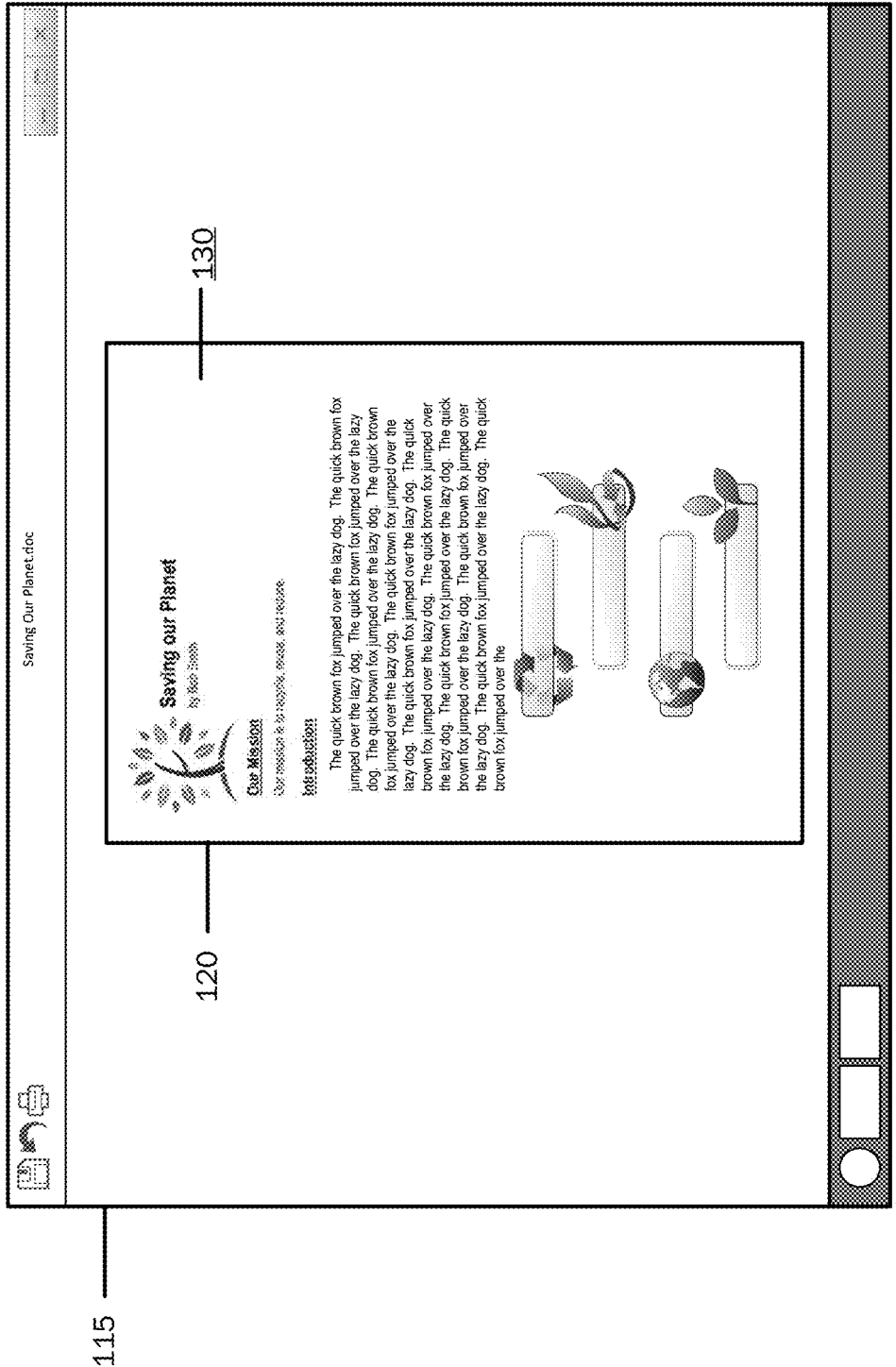

Referring now to FIG. 2, a process flow diagram of a method for providing content before a zoom out operation according to another embodiment is illustrated. Reference may also be made to FIGS. 3A-3C for illustrations this embodiment. The method 200 starts at OPERATION (205) and proceeds to OPERATION (210), where a zoom out functionality is selected. For example, a user may wish to zoom out to see more of a document 120 at a reduced size. As described above, a zoom out functionality may be selected via various methods. Upon receiving an indication of a selection of a zoom out functionality (210), the old content 125 may be retained (215), and at OPERATION (220), the new content 130 may be stretched to a current zoom level, and since the new content is of lower fidelity in the zoom out case, it may be placed under the old content 125.

Referring now to FIG. 3A, a document 120 is displayed in an application user interface 115 before a zoom out operation. Prior to zooming out, as described above, the new content 130 may be stretched to the current zoom level, aligned with the old content 125, and placed underneath the old content 125. As shown, the new content 130 may be clipped by the bounds of the application user interface window 115.

Referring back to FIG. 2, the method 200 proceeds to OPERATION (225), where the new content 130 zooms out with the old content 125. OPERATION (225) is illustrated in FIG. 3B. According to one embodiment, if a content texture being zoomed out has an opaque background, the old content 125 may fade out as it is zoomed (230). According to an embodiment, the old content 125 may fade out for the duration of the zoom operation (225).

After the zoom out operation (225), as illustrated in FIG. 3C, the old content 125 may be deleted (235). The method 200 ends at OPERATION (295).

Embodiments may provide various options for handling new content 130 when utilizing a zoom in functionality. If a client application 150 is unable to pre-render content in a zoom in operation, according to an embodiment, new content 130 may be provided after or during the zoom in operation. According to this embodiment, the old content 125 may be zoomed in, which may cause it to stretch. The new content 130 may be displayed once it is fully rendered.

Figure 4:
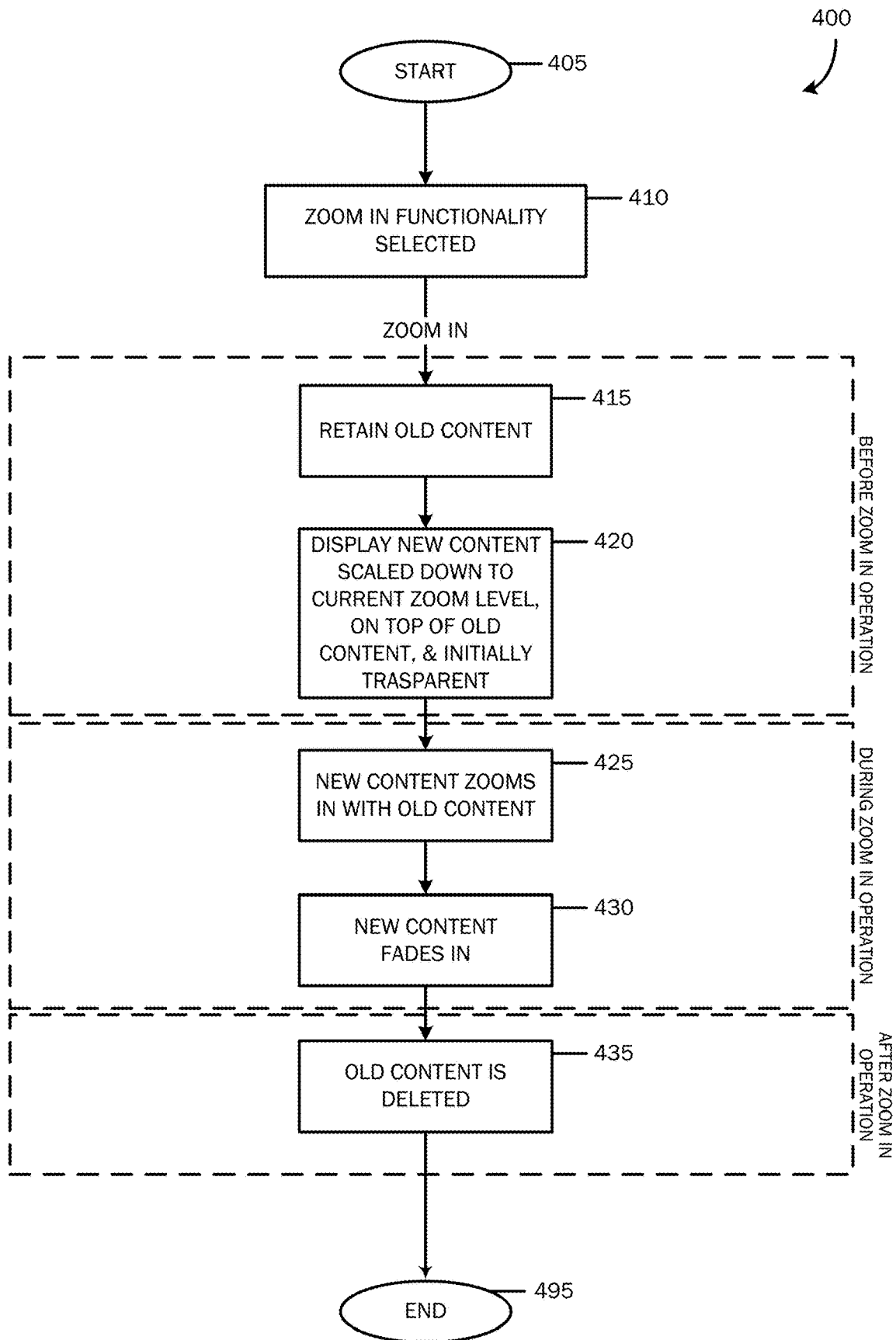
FIG. 4 is process flow diagram illustrating a method for providing content before a zoom in operation according to an embodiment.
Figure 5A:
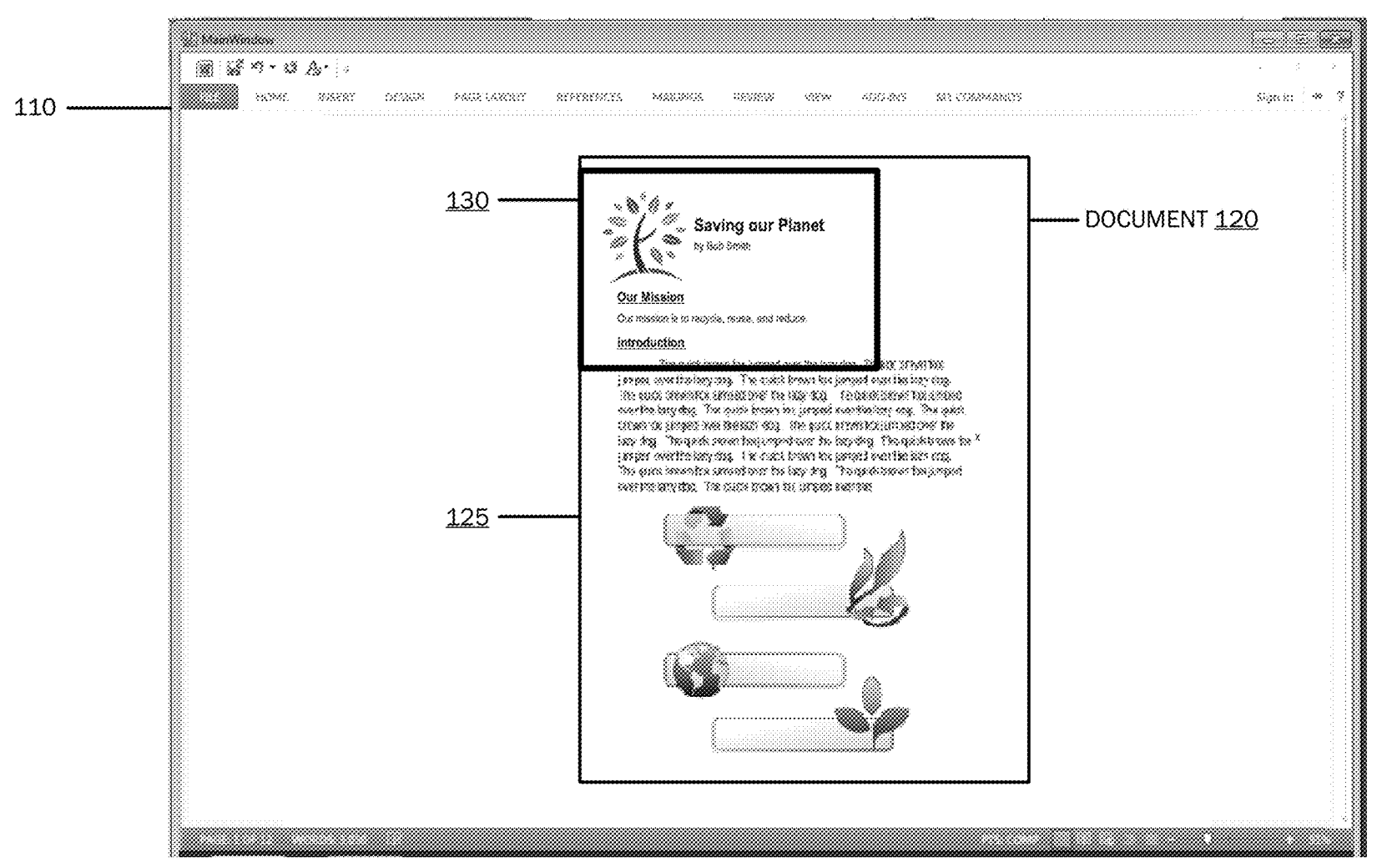
Figure 5B:
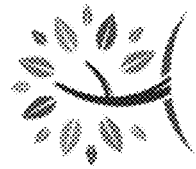

Referring now to FIG. 4, a process flow diagram of a method for providing content before a zoom in operation according to another embodiment is illustrated. Reference may also be made to FIGS. 5A-5C for illustrations of this embodiment. The method 400 starts at OPERATION (405) and proceeds to OPERATION (410), where a zoom in functionality is selected. For example, a user may wish to zoom in to see a portion of a document 120 at a magnified size. As described above, a zoom in functionality may be selected via various methods. Upon receiving an indication of a selection of a zoom in functionality (410), the old content 125 may be retained (415), and at OPERATION (420), the new content 130 may be scaled down to the current zoom level and placed on top of the old content 125 since, when zooming in, the new content is of higher fidelity. The new content 125 may be initially transparent as it fades in during the zoom operation.

Referring now to FIG. 5A, a document 120 is displayed in an application user interface 115 before a zoom in operation. Prior to zooming in, as described above, the new content 130 may be scaled down to a current zoom level, aligned with the old content 125, placed on top of the old content 125, and may initially be transparent.

Referring back to FIG. 4, the method 400 proceeds to OPERATION (425), where the new content 130 zooms in with the old content 125. OPERATION (425) is illustrated in FIG. 5B. According to one embodiment, if a content texture being zoomed in has an opaque background, the new content 130 may fade in as it is zoomed (430) instead of being displayed instantly. According to an embodiment, the new content 130 may fade in for the duration of the zoom operation (425). For example, if the zoom operation takes 200 ms, and the new content 130 is updated 100 ms into the zoom animation (425), the new content may start partially faded in and may completely fade in by the end of the zoom operation. If the new content 130 is updated after the animation (425) completes, the new content may snap into place.

After the zoom in operation (425), as illustrated in FIG. 5C, the old content 125 may be deleted (435). The method 400 ends at OPERATION (495). According to an embodiment, if a client application 150 does not provide new content 130 prior to zooming, the old content 125 may be used to zoom and may be retained until the new content is provided. When the new content 130 is provided, it may be updated without flashing by displaying the new content first, then hiding the old content 125. This may prevent a white flash that can occur if the old content 125 is hidden before the new content 130 is updated.

According to one embodiment, multiple zoom operations may occur in succession within a predetermined time period. When this occurs, more content than an initial and selected zoom level may be sent from the client application 150 to the graphical rendering, animation and display component 160. According to this embodiment, the content at the initial and selected zoom level may be retained by the component 160, and the rest of the content may be discarded. Consider for example, a user is using a word processing application 150, and selects to increase a current zoom level, for example 90%, via selecting a zoom functionality control, such as a zoom slider. The user, for example, may click on a control, such as a plus sign, to increase the zoom level from 90% to 100%. The content at the 90% zoom level may be retained by the component 160 while the content is updated to the 100% zoom level. The user may, within the predetermined time period, select to increase the current zoom level, currently 100%, to 110%. According to this embodiment, the content at the 90% zoom level may be retained by the component 160, and the content at the 100% zoom level may be discarded. The content at the two extreme ranges (e.g., 90% and 110%) may be retained during the predetermined time period.

Various computing devices, for example a tablet computing device 105, may comprise a touch computer-enabled display surface 110 operable to detect the presence and location of a touch within the display area. A user may interact with user interface components and displayed content by touching the display surface 110. As can be appreciated, touch triggered zoom operations may involve some ambiguity in that a user may be using a touch zoom motion, such as a pinching motion. As one can imagine, a plurality of current zoom levels may be detected during a touch zoom motion, such as a pinching motion. According to one embodiment, when a user zooms using touch functionalities, the graphical rendering, animation and display component 160 may know about a zoom level before the client application 150. According to this embodiment, neither the component 160 nor the application 150 may know the final selected zoom level while the user is in the touch session. When a different zoom level is detected, the component 160 may provide a notification to its client 150 to inform the client application when to draw.

According to another embodiment, as a zoom level is changing, the component 160 may constantly send this event to inform the client 150 to render content as fast as it can. This may enable a user to see the highest fidelity content possible. For example, as the zoom level is changing, the component 160 may notify the client 150 of the current zoom level and to render the content at that level. The content may be retained at the initial zoom level, which may allow for displaying content during the zoom operation. When an updated zoom level is detected, the client 150 may be notified of the updated zoom level.

According to another embodiment, the content may stay at the initial zoom level during a zoom touch session. The client 150 may render more content that is visible as a user zooms. The component 160 may scale the content to the current zoom level. When the user ends the zoom operation (e.g., lifts his/her finger from the display surface 110), the component 160 may send a notification to re-render the content. This may cause the client 150 to snap to the final zoom level.

According to another embodiment, the component 160 may send occasional notifications to its client 150 to update the content at different zoom levels. For example, the component 160 may send a notification when a user pauses during a zoom touch motion (e.g., zoom pinch).

Figure 6:
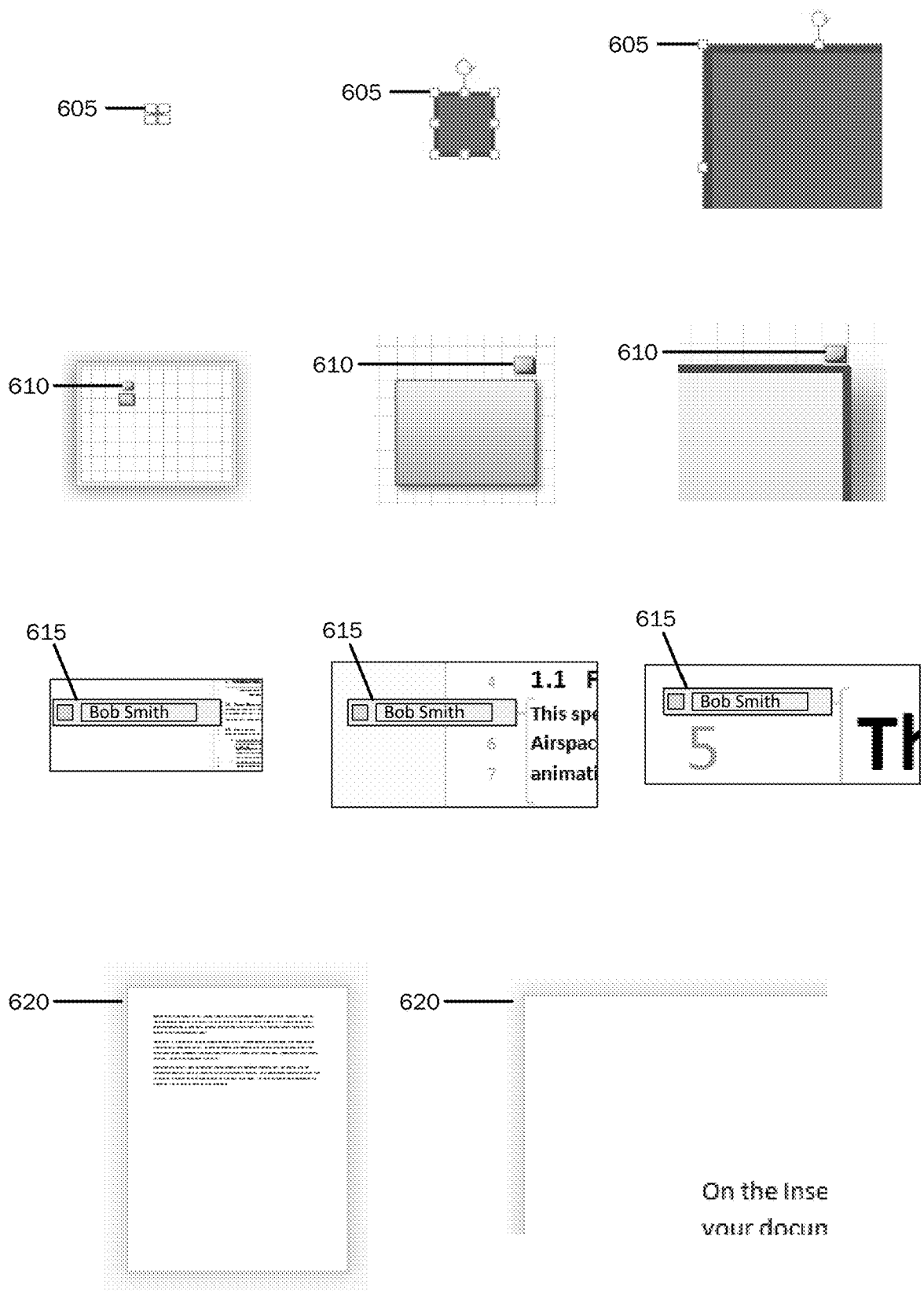
FIG. 6 is an illustration of examples of various non-optical content.

Embodiments of the present invention may provide for hiding non-optical content during zooming. During a zoom operation, various elements, herein referred to as non-optical content, may not be zoomed at the same level as other document content. Referring now to FIG. 6, examples of various non-optical content are illustrated. Some non-optical content items, such as a selection handle 605, may stay at the same size at different zoom levels. Other non-optical content items, such as a comment icon 610, may zoom within a certain range, but may have a minimum and a maximum size as illustrated in FIG. 6. According to one embodiment, some non-optical content items may be hidden and then redisplayed after the zoom operation has completed. For example, a coauthoring UI element 615 may be hidden, and then shown after the zoom operation.

Some non-optical content items may not be hidden during a zoom operation. For example, a page border 620, which may be rendered as a shadow, may stay at a constant width. A page border 620 may smoothly zoom and have the same thickness at all zoom levels. This may be supported by enabling a non-optical zoom of a nine-grid image. Other features using a nine-grid image transformation may also leverage this functionality. As may be known to those skilled in the art, when working with images, nine-grid rendering may be utilized to control how an image is resized. When an image is resized normally, the entire image is stretched evenly and linearly in both horizontal and vertical dimensions. When using nine-grid rendering, it can be specified how different segments of the image are stretched. This feature may be useful for preserving the detail on image corners.

Embodiments of the present invention provide for smooth scrolling operations. During a scroll operation, content may be displayed at a low fidelity in advance for content that is not yet in view. Once scrolling stops, the graphical rendering, animation and display component 160 may provide the ability to update pre-rendered content with higher fidelity content without a flashing effect by retaining the old content and not hiding it until the new content is displayed.

According to one embodiment, content may be instantly updated when new content becomes available, which may typically occur when content is updated after a scrolling operation. In order to improve responsiveness and to prevent users from waiting for content to fade in, the content may not be crossfaded in. According to another embodiment, content may be crossfaded in when it is updated with new content, which may typically occur when content is updated during a zoom operation. This may ease the transition between content rendered at different fidelities.

Figure 7:
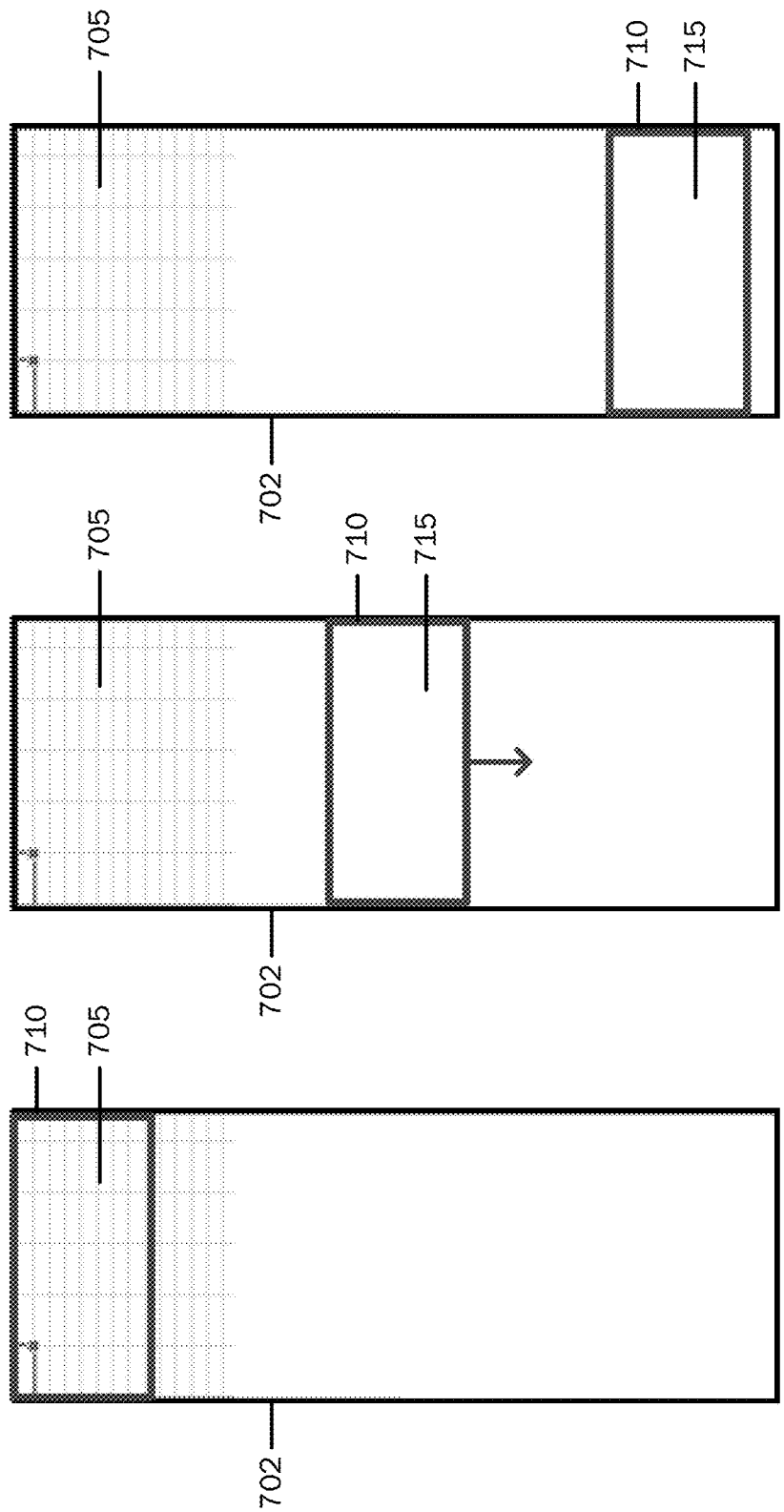
FIGS. 7A-7C are illustrations of a current method of not pre-rendering content during a scrolling process.

Currently, when content is scrolled a long distance, the graphical rendering, animation and display component 160 may send callbacks asking the client application 150 to update the content after the animation completes. This may result in leaving users with blank content while they are waiting for content to be updated. This issue is illustrated in FIGS. 7A-7C. Referring now to FIG. 7A, a document 702 is shown. As can be seen, the length of the document 702 is greater than what is displayed in a viewport 710. Before a scrolling operation, a portion of content 705 is visible in a viewport 710. As shown in FIG. 7B, during animation, as the viewport 710 moves over blank content, users may see blank content 715 because the content has not yet been rendered. As shown in FIG. 7C, when the viewport 710 reaches its final scrolling destination, blank content 715 may be displayed while the content is being updated in the current view.

Figure 8:
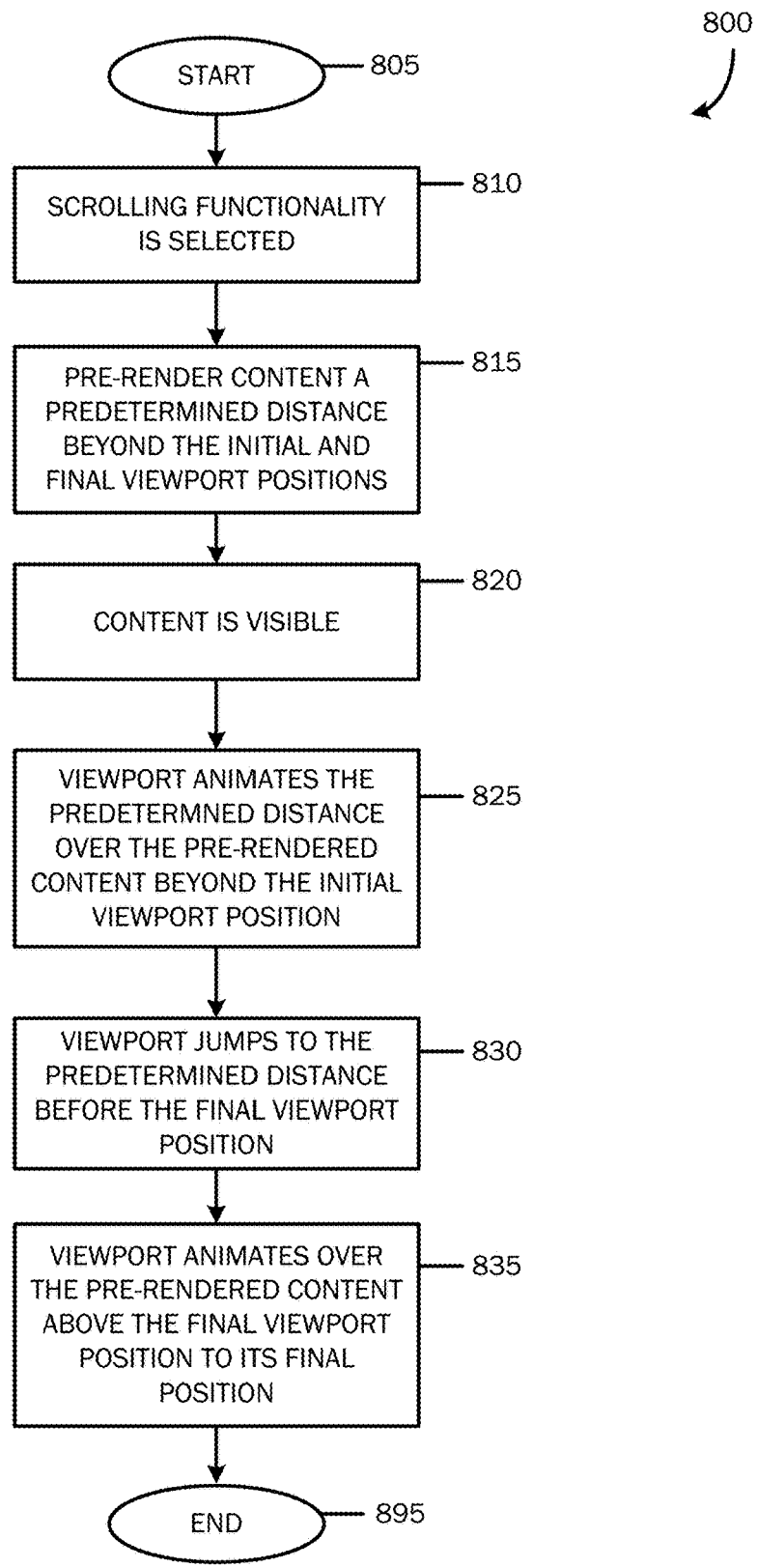
FIG. 8 is a process flow diagram illustrating a method for providing teleporting during a scrolling operation according to an embodiment.

Referring now to FIG. 8, a process flow diagram of a method 800 for providing teleporting during a scrolling operation according to an embodiment is illustrated. Reference may also be made to FIGS. 9A-9E for illustrations of this embodiment. Various applications 150 may utilize this functionality to skip over content that has not been rendered during scrolling operations. During a long distance scrolling via various scrolling methods, a client application 150 may know the final location of the scrolling viewport 710 prior to scheduling the scrolling animation. Since a client knows the final location of the scrolling viewport 710, the content in the final location can be pre-rendered. That is, the client does not wait for a notification from the graphical rendering, animation and display component 160 to render the content. There may be some client applications 150 that cannot pre-render all of the content between the initial and final zooming positions. To avoid users seeing blank content 715 during the animation, as illustrated in FIGS. 9A-9E, a client can teleport the viewport 710 so that it instantly skips over the blank content. This may be done in such a way that users may not perceive that content is being skipped. It may appear as one continuous scrolling operation. Content may be pre-rendered a predetermined amount of distance beyond the viewport's initial and final positions to allow the viewport 710 to animate over some content.

Figure 9A:
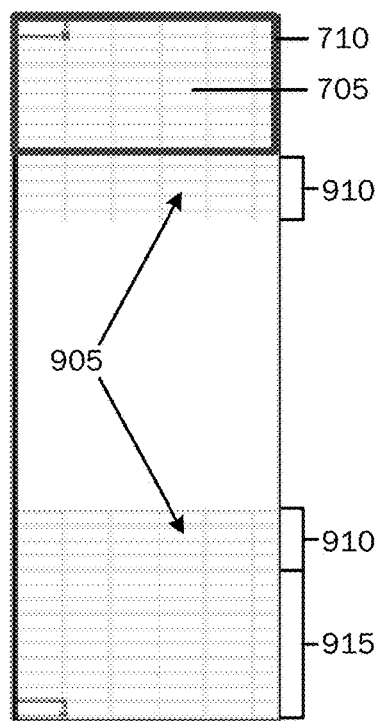
FIGS. 9A-9E are illustrations of the method of FIG. 8.

The method 800 starts at OPERATION (805) and proceeds to OPERATION (810), where a scrolling functionality is selected. For example, a user may wish to scroll through a document 702 to view another portion of the document. As described above, scrolling functionalities may be activated via various methods. For example, some mouse devices and other pointing devices may have built-in scrolling and zooming capabilities. Also, a selection of an arrow key, a page up or page down key, or a selection and dragging of a scroll box may be an indication of a selection of a scrolling functionality. Upon receiving an indication of a selection of a scrolling functionality (810) and prior to a scrolling animation, as illustrated in FIG. 9A, a portion of content 905 may be pre-rendered (815). According to an embodiment, the portion of pre-rendered content 905 may include content within a predetermined distance 910 beyond the initial viewport 710 position and above the final viewport position 915. For example, a client application 150 may pre-render content 800 pixels 910 beyond the initial viewport position and 800 pixels above the final viewport position.

Figure 9B:
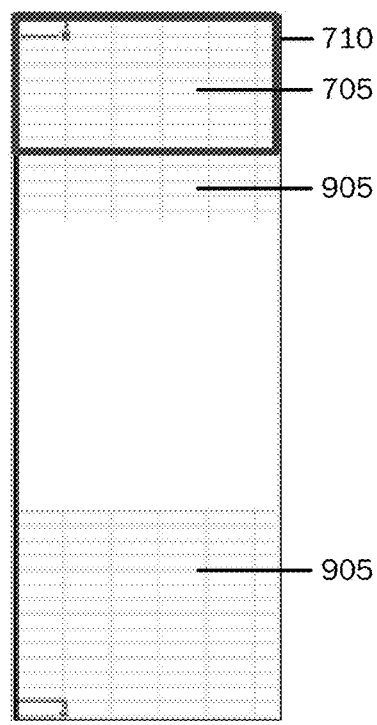
Figure 9C:
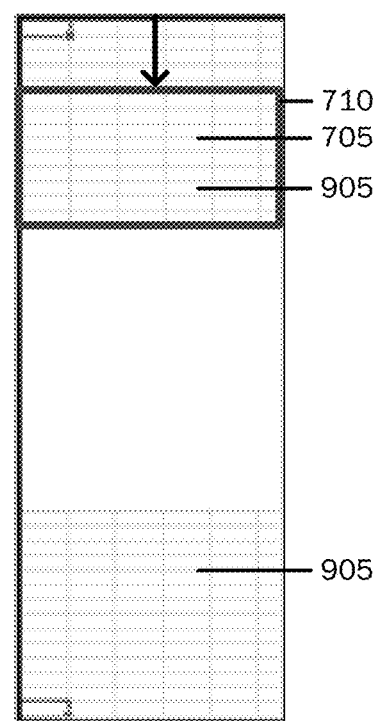

At OPERATION (820), as illustrated in FIG. 9B, the content 705 within the viewport 710 as well as the pre-rendered content 905 may be visible. As illustrated in FIG. 9C, the method 800 proceeds to OPERATION (825), where the viewport 710 is animated the predetermined distance 910 (e.g., 800 pixels) over the pre-rendered content 905 beyond the initial viewport position. In addition, the animation may accelerate the viewport 710 to a certain speed.

Figure 9D:
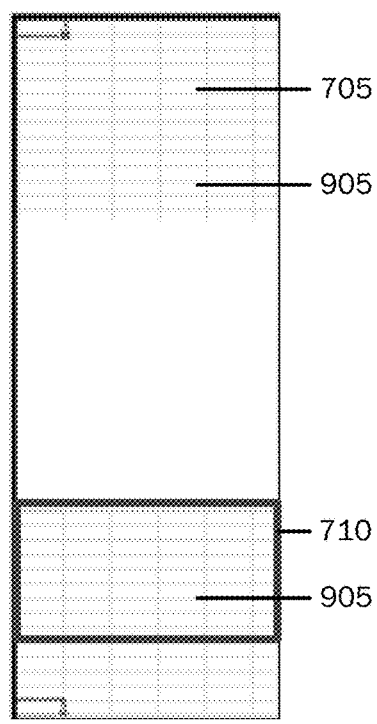

At OPERATION (830), and as illustrated in FIG. 9D, the viewport 710 may jump down to the predetermined distance 910 (e.g., 800 pixels) above the final viewport position. The viewport 710 may skip over the content of the document 702 that has not been rendered. This may occur instantly, so that users may not perceive the skipped content.

Figure 9E:
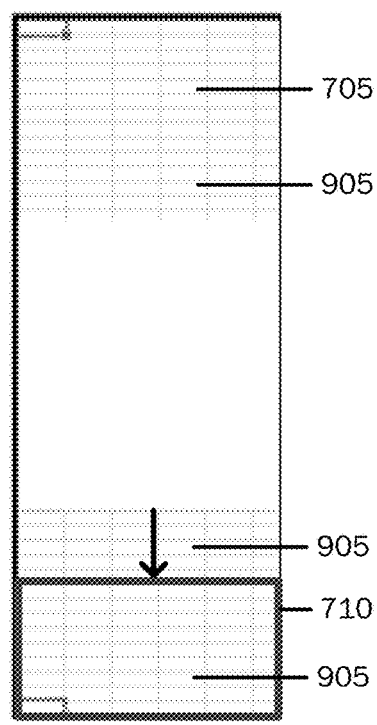

As illustrated in FIG. 9E, the method 800 proceeds to OPERATION (835), where the viewport 710 animates over the pre-rendered content 905 above the final viewport position to its final position. As described above, the teleporting feature provides an animation of a portion of pre-rendered content 905, and may prevent from displaying blank content 715 while a user is waiting for content to be updated.

According to an embodiment, the velocity of the viewport 710 may change throughout the animation in order to create a soft landing effect. The velocity just before the viewport 710 teleports and just after the viewport teleports may be the same. This may prevent a user from seeing jarring changes in speed during the scrolling operation. This may also ensure that the scroll operation looks like one continuous operation and masks the fact that content 715 is skipped. Additionally, the scrolling animation may appear like other scrolling animations that do not skip content. The method 800 ends at OPERATION 895.

Figure 10:
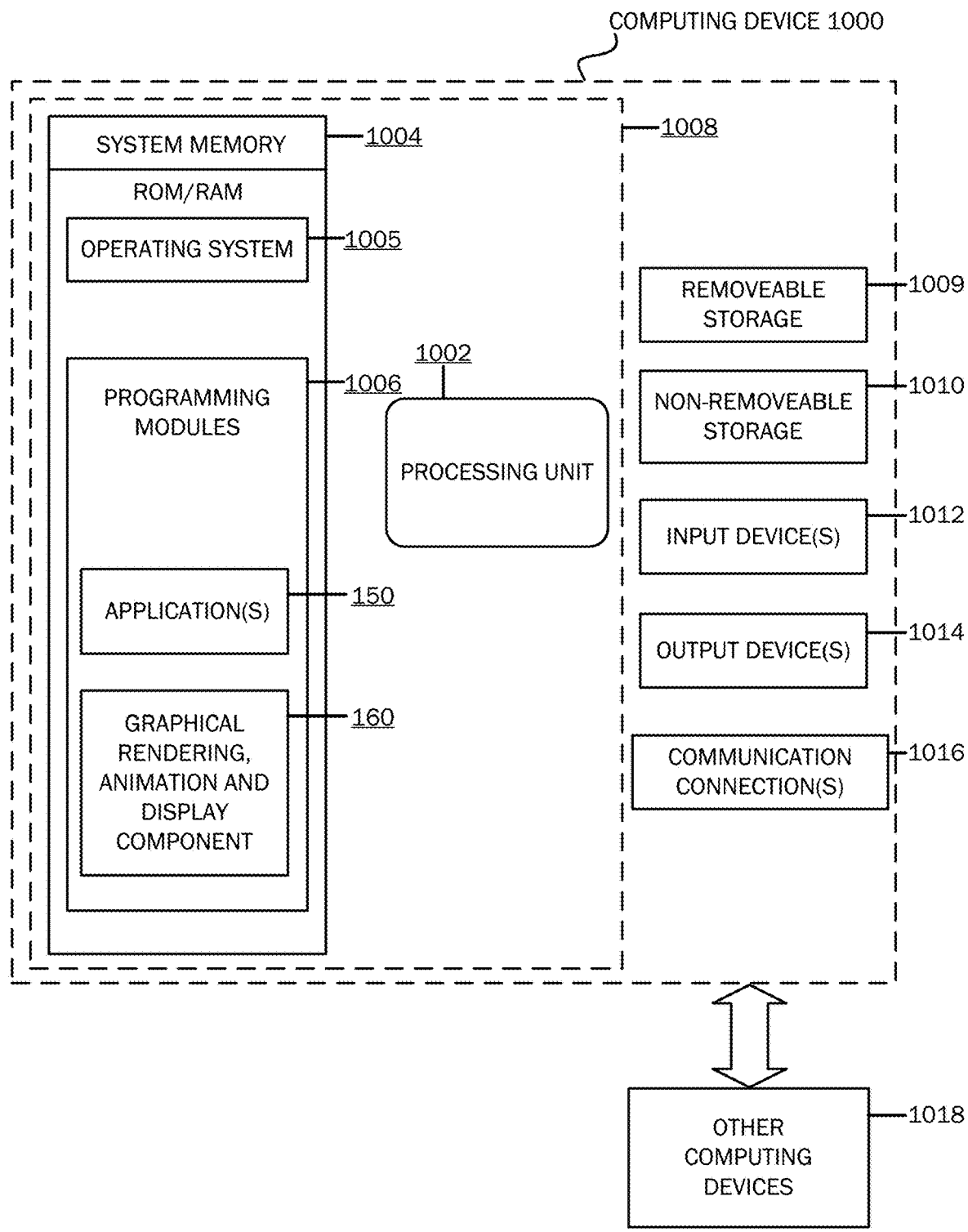
FIG. 10 is a simplified block diagram illustrating example physical components of a computing device with which embodiments of the invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 10-12 and the associated descriptions provide a discussion of a variety of operating environments in which embodiments of the invention may be practiced. However, the devices and systems illustrated and discussed with respect to FIGS. 10-12 are for purposes of example and illustration and are not limiting of a vast number of computing device configurations that may be utilized for practicing embodiments of the invention, described herein.

FIG. 10 is a block diagram illustrating example physical components of a computing device 1000 with which embodiments of the invention may be practiced. In a basic configuration, computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005, one or more programming modules 1006, and may include one or more applications 150. For example, the one or more applications 150 may include, but is not limited to, a word processing application, a spreadsheet application, a database application, an email application, a slideshow presentation application, a web design application, a drawing application, etc. Operating system 1005, for example, may be suitable for controlling computing device 1000's operation. Furthermore, embodiments of the invention may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computing device 1000 may also contain a communication connection 1016 that may allow device 1000 to communicate with other computing devices 1018, such as over a network in a distributed computing environment, for example, an intranet or the Internet. Communication connection 1016 is one example of communication media.

As stated above, a number of program modules and data files may be stored in system memory 1004, including operating system 1005. While executing on processing unit 1002, programming modules 1006, such as application(s) 150 and the graphical rendering, animation and display component 160 may perform processes including, for example, one or more methods 200's, 400's and 800's operations as described above. The aforementioned process is an example, and processing unit 1002 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to application(s) 150 and the graphical rendering, animation and display component 160 may be operated via application-specific logic integrated with other components of the computing device/system 1000 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
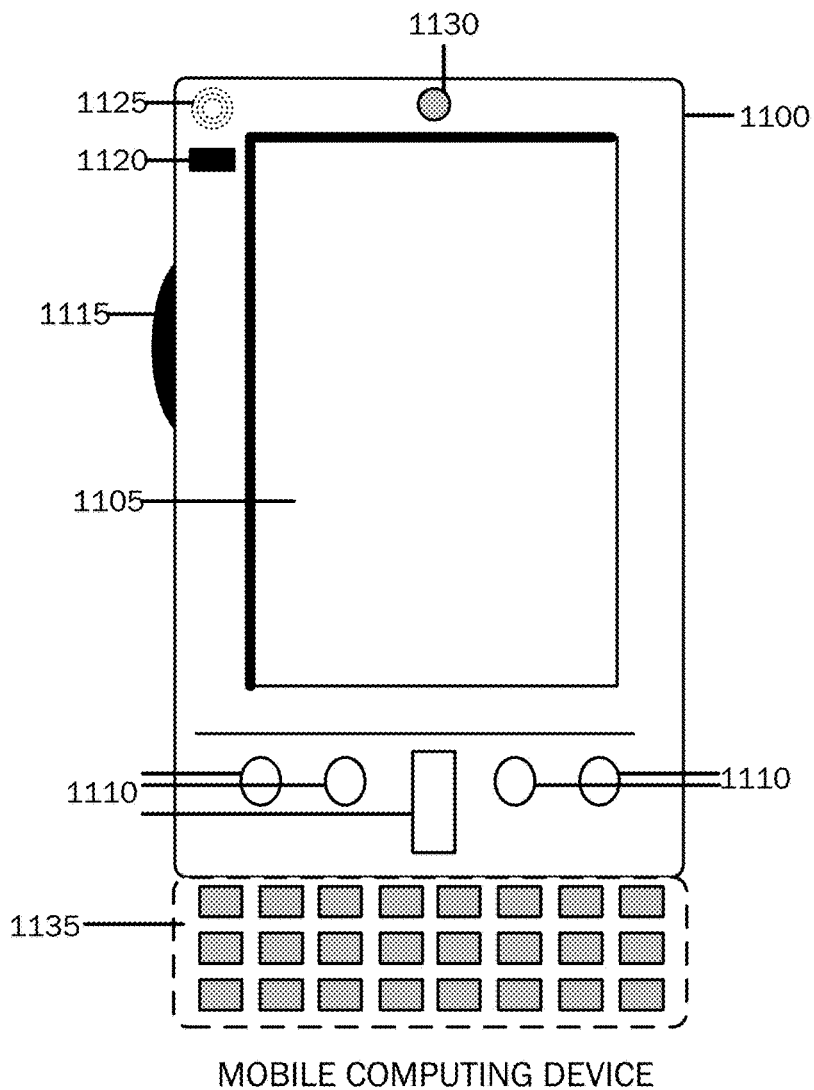
FIGS. 11A-11B are simplified block diagrams of a mobile computing device with which embodiments of the present invention may be practiced.
Figure 11B:
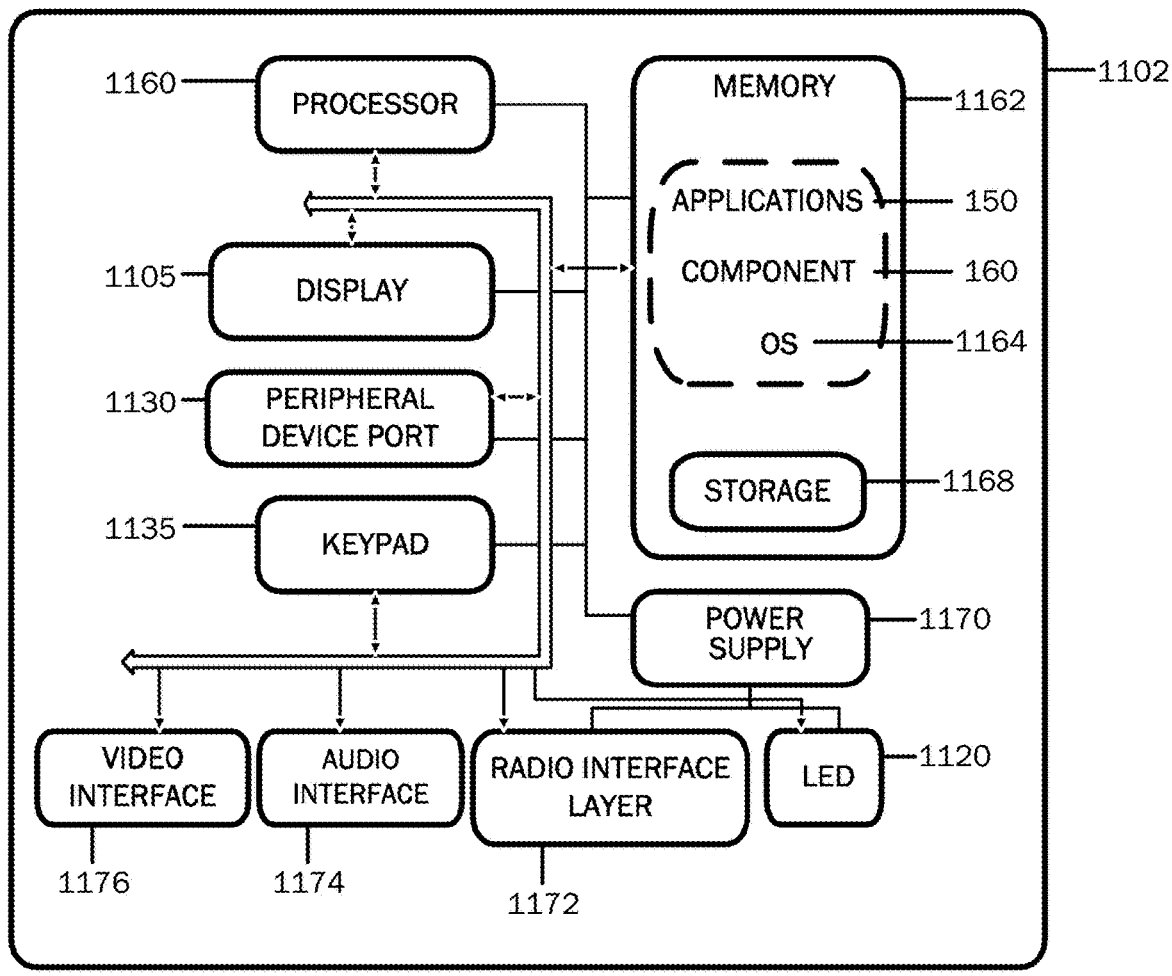
Figure 12:
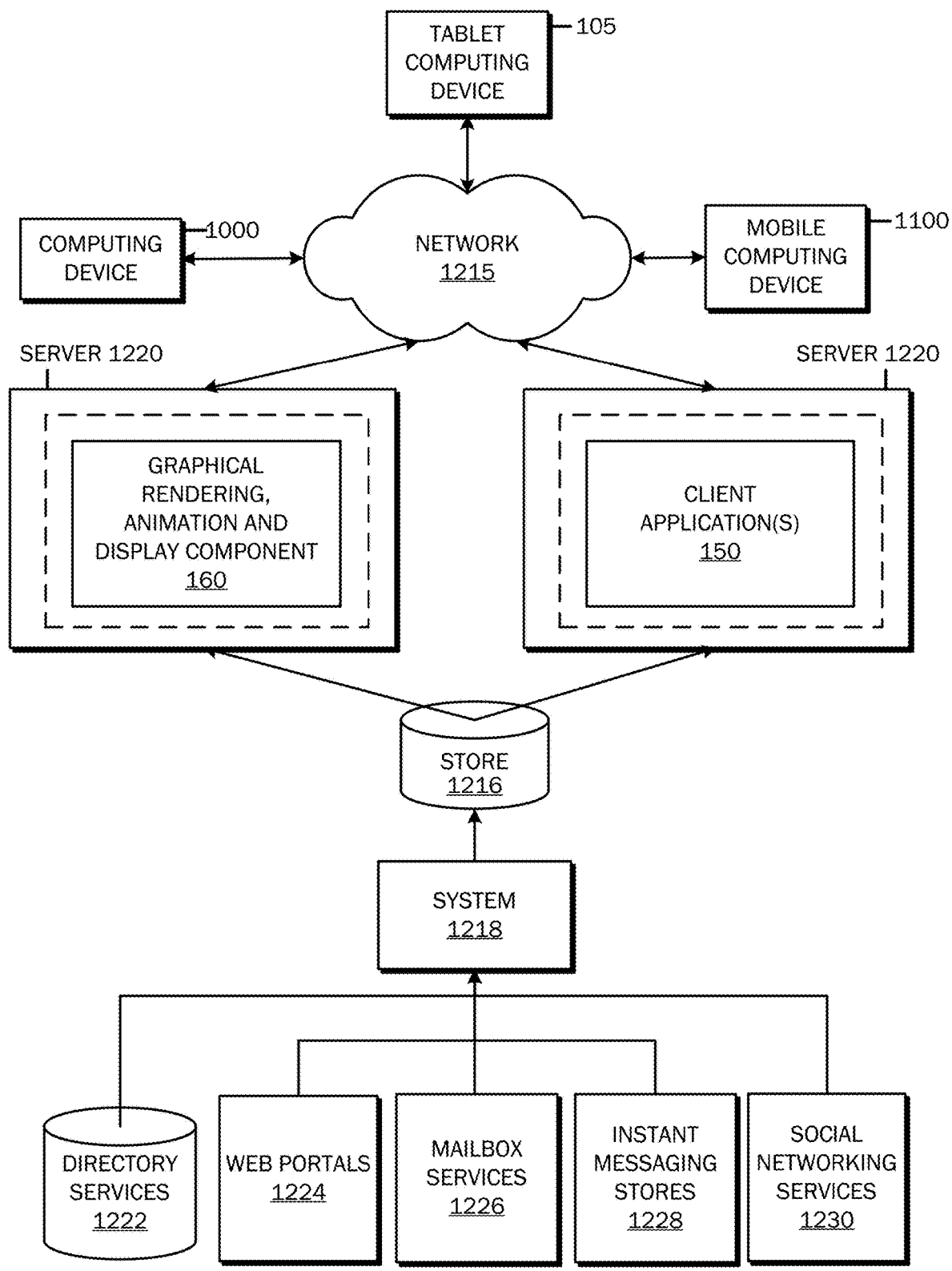
FIG. 12 is a simplified block diagram of a distributed computing system in which embodiments of the present invention may be practiced.

FIGS. 11A and 11B illustrate a suitable mobile computing environment, for example, a mobile telephone 1100, a smartphone, a tablet personal computer 105, a laptop computer, and the like, with which embodiments of the invention may be practiced. With reference to FIG. 11A, an example mobile computing device 1100 for implementing the embodiments is illustrated. In a basic configuration, mobile computing device 1100 is a handheld computer having both input elements and output elements. Input elements may include touch screen display 1105 and input buttons 1110 that allow the user to enter information into mobile computing device 1100. Mobile computing device 1100 may also incorporate an optional side input element 1115 allowing further user input. Optional side input element 1115 may be a rotary switch, a button, or any other type of manual input element. In alternative embodiments, mobile computing device 1100 may incorporate more or less input elements. For example, display 1105 may not be a touch screen in some embodiments. In yet another alternative embodiment, the mobile computing device is a portable phone system, such as a cellular phone having display 1105 and input buttons 1115. Mobile computing device 1100 may also include an optional keypad 1135. Optional keypad 1135 may be a physical keypad or a "soft" keypad generated on the touch screen display.

Mobile computing device 1100 incorporates output elements, such as display 1105, which can display a graphical user interface (GUI). Other output elements include speaker 1125 and LED light 1120. Additionally, mobile computing device 1100 may incorporate a vibration module (not shown), which causes mobile computing device 1100 to vibrate to notify the user of an event. In yet another embodiment, mobile computing device 1100 may incorporate a headphone jack (not shown) for providing another means of providing output signals.

Although described herein in combination with mobile computing device 1100, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices.

FIG. 11B is a block diagram illustrating components of a mobile computing device used in one embodiment, such as the computing device shown in FIG. 11A. That is, mobile computing device 1100 can incorporate system 1102 to implement some embodiments. For example, system 1102 can be used in implementing a "smart phone" that can run one or more applications similar to those of a desktop or notebook computer such as, for example, browser, e-mail, scheduling, instant messaging, and media player applications. In some embodiments, system 1102 is integrated as a computing device, such as an integrated personal digital assistant (PDA) and wireless phone.

One or more application programs 150 and a graphical rendering, animation and display component 160 may be loaded into memory 1162 and run on or in association with operating system 1164. Examples of application programs include phone dialer programs, e-mail programs, PIM (personal information management) programs, electronic mail and contacts applications, word processing applications, spreadsheet applications, database applications, slide presentation applications, drawing or computer-aided application programs, messaging programs, and so forth. System 1102 also includes non-volatile storage 1168 within memory 1162. Non-volatile storage 1168 may be used to store persistent information that should not be lost if system 1102 is powered down. Applications 150 and the graphical rendering, animation and display component 160 may use and store information in non-volatile storage 1168, such as e-mail or other messages used by an e-mail application, and the like. A synchronization application (not shown) also resides on system 1102 and is programmed to interact with a corresponding synchronization application resident on a host computer to keep the information stored in non-volatile storage 1068 synchronized with corresponding information stored at the host computer. As should be appreciated, other applications may be loaded into memory 1162 and run on the device 1100.

System 1102 has a power supply 1170, which may be implemented as one or more batteries. Power supply 1170 might further include an external power source, such as an AC adapter or a powered docking cradle that supplements or recharges the batteries.

System 1102 may also include a radio 1172 that performs the function of transmitting and receiving radio frequency communications. Radio 1172 facilitates wireless connectivity between system 1102 and the "outside world", via a communications carrier or service provider. Transmissions to and from radio 1172 are conducted under control of OS 1164. In other words, communications received by radio 1172 may be disseminated to application programs 150 and component 160 via OS 1164, and vice versa.

Radio 1172 allows system 1102 to communicate with other computing devices, such as over a network. Radio 1172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1102 is shown with two types of notification output devices; LED 1120 that can be used to provide visual notifications and an audio interface 1174 that can be used with speaker 1125 to provide audio notifications. These devices may be directly coupled to power supply so that when activated, they remain on for a duration dictated by the notification mechanism even though processor 1160 and other components might shut down for conserving battery power. LED 1120 may be programmed to remain on indefinitely until the user takes action to indicate the powered-on status of the device. Audio interface 1174 is used to provide audible signals to and receive audible signals from the user. For example, in addition to being coupled to speaker 1125, audio interface 1174 may also be coupled to a microphone to receive audible input, such as to facilitate a telephone conversation. In accordance with embodiments of the present invention, the microphone may also serve as an audio sensor to facilitate control of notifications, as will be described below. System 1102 may further include video interface 1176 that enables an operation of on-board camera 1130 to record still images, video stream, and the like.

A mobile computing device implementing system 1102 may have additional features or functionality. For example, the device may also include additional data storage devices (removable and/or non-removable) such as, magnetic disks, optical disks, or tape. Such additional storage is illustrated in FIG. 11B by storage 1168. Computer storage media may include volatile and nonvolatile, removable and non-removable media implemented in any method or technology for storage of information, such as computer readable instructions, data structures, program modules, or other data.

Data/information generated or captured by the device 1100 and stored via the system 1102 may be stored locally on the device 1100, as described above, or the data may be stored on any number of storage media that may be accessed by the device via the radio 1172 or via a wired connection between the device 1100 and a separate computing device associated with the device 1100, for example, a server computer in a distributed computing network, such as the Internet. As should be appreciated such data/information may be accessed via the device 1100 via the radio 1172 or via a distributed computing network. Similarly, such data/information may be readily transferred between computing devices for storage and use according to well-known data/information transfer and storage means, including electronic mail and collaborative data/information sharing systems.

FIG. 12 illustrates a system architecture for storing and updating content to enable smooth animation effects during zooming and scrolling, as described above. Content developed, interacted with or edited in association with an application 150 or component 160 may be stored in different communication channels or other storage types. For example, various content items along with information from which they are developed may be stored using directory services 1222, web portals 1224, mailbox services 1226, instant messaging stores 1228 and social networking sites 1230. A system 1218 may use any of these types of systems or the like for providing smooth zooming and scrolling functionalities, as described herein. A server 1220 may receive requests to run an application 150 and a graphical rendering, animation and display component 160 and pass items to clients. As one example, server 1220 may be a web server providing content over the web. Server 1220 may provide content over the web to clients through a network 1215. Examples of clients that may obtain content include computing device 1000, which may include any general purpose personal computer, a tablet computing device 105 and/or mobile computing device 1100 which may include smart phones. Any of these devices may obtain content from the store 1216.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for updating content to enable smooth animation effects during scrolling, the method comprising:
    causing display of a portion of a document at an initial viewport position, wherein the document includes content that extends beyond the initial viewport position;
    receiving an indication to initiate a scroll operation to a final viewport position;
    based on the indication to initiate the scroll operation, pre-rendering content from the document a predetermined distance beyond the initial viewport position, a predetermined distance before the final viewport position, and in the final viewport position;
    animating the viewport the predetermined distance over the pre-rendered content beyond the initial viewport position, wherein animating the viewport results in displaying the pre-rendered content in the pre-determined distance beyond the initial viewport position;
    relocating the viewport over the pre-rendered content the predetermined distance before the final viewport position, wherein content between the predetermined distance beyond the initial viewport position and the predetermined distance before the final viewport position is skipped during the animating and relocating; and
    animating the viewport to the final viewport position.

2. The method of claim 1, wherein animating the viewport comprises:
    animating the viewport the predetermined distance over the pre-rendered content beyond the initial viewport position, the animation ending with a specific velocity; and
    animating the viewport to the final viewport position, the animation starting at the same specific velocity to simulate one continuous scrolling operation.

3. The method of claim 1, wherein the predetermined distance beyond the initial viewport position is approximately the same as the predetermined distance before of the final viewport position.

4. The method of claim 1, wherein animating the viewport animates the viewport accelerating to a velocity.

5. The method of claim 4, wherein the velocity changes throughout the animation to create a soft landing effect during animation of the viewport to the final viewport position.

6. The method of claim 1, further comprising receiving a scrolling functionality selection, wherein the selection is received as one of a mouse-wheel input, an arrow key input, a page up input, a page down input, and dragging of a scroll box input.

7. The method of claim 1, wherein the predetermined distance beyond the initial viewport position is defined by a number of pixels.

8. A hardware device storing instructions that when executed by at least one processor perform a set of operations comprising:
    receiving an indication to initiate a scroll operation to a final viewport position;
    based on the indication to initiate the scroll operation, pre-rendering content a predetermined distance beyond an initial viewport position, a predetermined distance before the final viewport position, and in the final viewport position;
    animating the viewport the predetermined distance over the pre-rendered content beyond the initial viewport position, wherein animating the viewport results in displaying the pre-rendered content in the pre-determined distance beyond the initial viewport position;
    relocating the viewport over the pre-rendered content the predetermined distance before the final viewport position wherein content between the predetermined distance beyond the initial viewport position and the predetermined distance before the final viewport position is skipped during the animating and relocating; and
    animating the viewport to the final viewport position.

9. The hardware device of claim 8, wherein animating the viewport comprises:
    animating the viewport the predetermined distance over the pre-rendered content beyond the initial viewport position, the animation ending with a specific velocity; and
    animating the viewport to the final viewport position, the animation starting at the same specific velocity to simulate one continuous scrolling operation.

10. The hardware device of claim 8, wherein the predetermined distance beyond the initial viewport position is approximately the same as the predetermined distance before of the final viewport position.

11. The hardware device of claim 8, wherein animating the viewport animates the viewport accelerating to a velocity.

12. The hardware device of claim 11, wherein the velocity changes throughout the animation to create a soft landing effect during animation of the viewport to the final viewport position.

13. The hardware device of claim 8, wherein the operations further comprise receiving a scrolling functionality selection, wherein the selection is received as one of a mouse-wheel input, an arrow key input, a page up input, a page down input, and dragging of a scroll box input.

14. The hardware device of claim 8, wherein the predetermined distance beyond the initial viewport position is defined by a number of pixels.

15. A system for updating content to enable smooth animation effects during scrolling, the system comprising:
    at least one processor; and
    a memory storing instructions that when executed by the at least one processor perform a method for updating content to enable smooth animation effects during scrolling, the method comprising:
        causing display of a portion of a document at an initial viewport position, wherein the document includes content that extends beyond the initial viewport position;
        receiving an indication to initiate a scroll operation to a final viewport position;

based on the indication to initiate the scroll operation, pre-rendering content from the document a predetermined distance beyond the initial viewport position, a predetermined distance before the final viewport position, and in the final viewport position;

animating the viewport the predetermined distance over the pre-rendered content beyond the initial viewport position, wherein animating the viewport results in displaying the pre-rendered content in the pre-determined distance beyond the initial viewport position;

relocating the viewport over the pre-rendered content the predetermined distance before the final viewport position, wherein content between the predetermined distance beyond the initial viewport position and the predetermined distance before the final viewport position is skipped during the animating and relocating; and animating the viewport to the final viewport position.

16. The system of claim 15, wherein animating the viewport comprises:

animating the viewport the predetermined distance over the pre-rendered content beyond the initial viewport position, the animation ending with a specific velocity; and animating the viewport to the final viewport position, the animation starting at the same specific velocity to simulate one continuous scrolling operation.

17. The system of claim 15, wherein animating the viewport animates the viewport accelerating to a velocity.

18. The system of claim 17, wherein the velocity changes throughout the animation to create a soft landing effect during animation of the viewport to the final viewport position.

19. The system of claim 15, further comprising receiving a scrolling functionality selection, wherein the selection is received as one of a mouse-wheel input, an arrow key input, a page up input, a page down input, and dragging of a scroll box input.

20. The system of claim 15, wherein the predetermined distance beyond the initial viewport position is defined by a number of pixels.

21. A method for updating content to enable smooth animation effects during scrolling, the method comprising:

causing display of a portion of a document at an initial viewport position, wherein the document includes content that extends beyond the initial viewport position;

receiving an indication to initiate a scroll operation to a final viewport position;

based on the indication to initiate the scroll operation, pre-rendering content from the document a predetermined distance beyond the initial viewport position, a predetermined distance before the final viewport position, and in the final viewport position;

animating the viewport the predetermined distance over the pre-rendered content beyond the initial viewport position, the animation starting with a first velocity and ending with a second velocity;

relocating the viewport over the pre-rendered content the predetermined distance before the final viewport position, wherein content between the predetermined distance beyond the initial viewport position and the predetermined distance before the final viewport position is skipped during the animating and relocating; and animating the viewport to the final viewport position, the animation starting at the second velocity to simulate one continuous scrolling operation.

22. The method of claim 21, wherein animating the viewport to the final viewport position includes gradually reducing the second velocity create a soft landing effect of the viewport into the final viewport position.

23. The method of claim 21, wherein the predetermined distance beyond the initial viewport position is approximately the same as the predetermined distance before of the final viewport position.

24. The method of claim 21, wherein the document is a word-processing document and scroll operation is a vertical scroll.

25. The method of claim 21, wherein the predetermined distance beyond the initial viewport position is defined by a number of pixels.

26. A system for updating content to enable smooth animation effects during scrolling, the system comprising:

at least one processor; and a memory storing instructions that when executed by the at least one processor perform a method for updating content to enable smooth animation effects during scrolling, the method comprising:

causing display of a portion of a document at an initial viewport position, wherein the document includes content that extends beyond the initial viewport position;

receiving an indication to initiate a scroll operation to a final viewport position;

based on the indication to initiate the scroll operation, pre-rendering content from the document a predetermined distance beyond the initial viewport position, a predetermined distance before the final viewport position, and in the final viewport position;

animating the viewport the predetermined distance over the pre-rendered content beyond the initial viewport position, wherein animating the viewport animates the viewport accelerating to a velocity;

relocating the viewport over the pre-rendered content the predetermined distance before the final viewport position, wherein content between the predetermined distance beyond the initial viewport position and the predetermined distance before the final viewport position is skipped during the animating and relocating; and animating the viewport to the final viewport position, wherein animating the viewport to the final viewport position includes gradually reducing the velocity create a soft landing effect of the viewport into the final viewport position.

27. The system of claim 26, wherein animating the viewport to the final viewport position includes starting the animating of the viewport at the velocity to simulate one continuous scrolling operation.

28. The system of claim 26, wherein the predetermined distance beyond the initial viewport position is approximately the same as the predetermined distance before of the final viewport position.

29. The system of claim 26, wherein the document is a word-processing document and scroll operation is a vertical scroll.

30. The system of claim 26, wherein the predetermined distance beyond the initial viewport position is defined by a number of pixels.

* * * * *